Oct. 28, 1930.　　A. KONOFF ET AL　　1,779,943
DOLL EYE MOUNTING
Filed Feb. 17, 1928
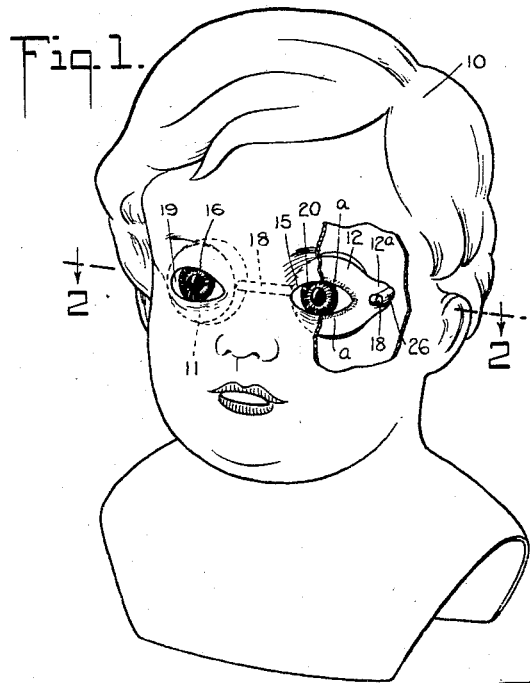
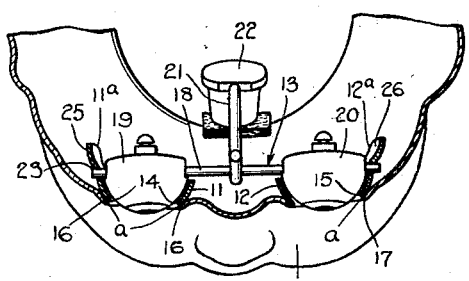
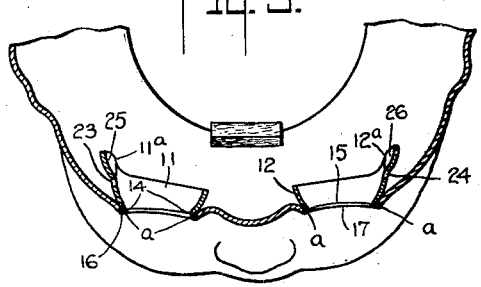
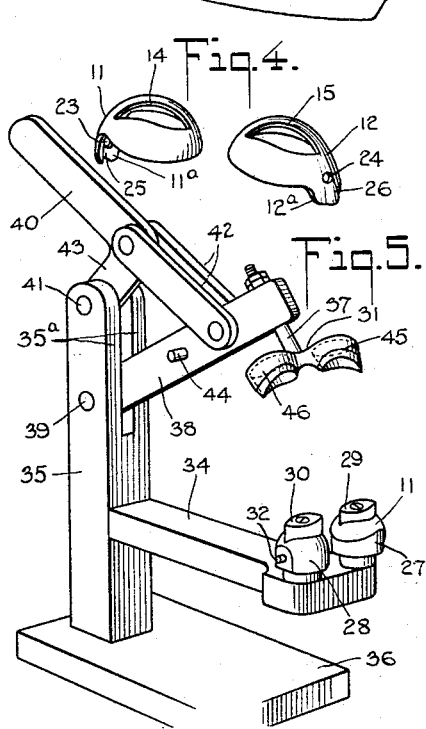
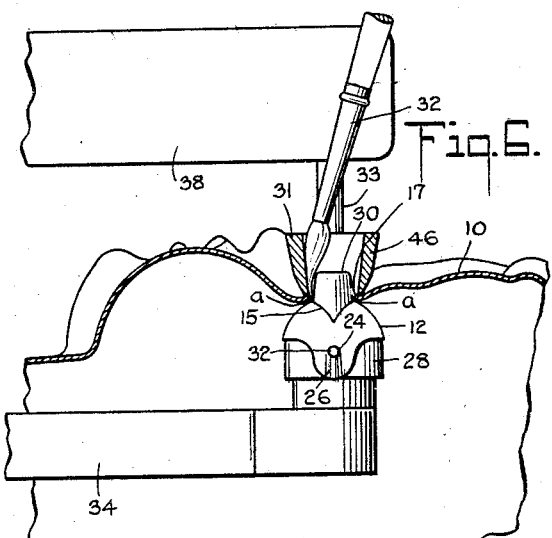
INVENTORS
Alexander Konoff
Samuel Marcus
BY
ATTORNEYS Patented Oct. 28, 1930

1,779,943

UNITED STATES PATENT OFFICE

ALEXANDER KONOFF, OF BROOKLYN, AND SAMUEL MARCUS, OF NEW YORK, N. Y., ASSIGNORS TO MARKON MANUFACTURING CO. INC., OF NEW YORK, N. Y., A CORPORATION OF NEW YORK

DOLL-EYE MOUNTING

Application filed February 17, 1928. Serial No. 254,986.

This invention relates to the art of mounting movable eye sets in dolls' heads; and has special reference to the provision of an improved eye set mounting for translucent or semi-transparent dolls' heads.

The prime desideratum of our present invention centers about the provision of a mounting for movable dolls' eyes or eye sets for translucent or semi-transparent dolls' heads such as are made, for example, from transparent celluloid or similar cellulose derivatives so attached to and supported within the doll's head as to render the interior construction of both the mounting and the eye set invisible through the semi-transparent or translucent walls of the doll's head.

In mounting movable or oscillatable eyes or eye sets in translucent or semi-transparent dolls' heads, serious difficulties have been encountered in affixing the mounting or support for the doll's eye set or eye members to the interior walls or surfaces of the doll's head, due primarily to the fact that the attachment of the support or mounting to the interior walls of the head becomes undesirably visible through the walls of the head from the exterior thereof, and due secondarily to the fact that the nature of the material of which the heads are made, as well as the comparative thinness of the walls thereof, renders unworkable and unfeasible the use and application of known mounting methods. When these known methods are applied or used, the eye mountings or supports thus attached to and visible through the walls of the head undesirably and objectionably mar the appearance and disfigure the wall surfaces of the head and largerly prevent the attainment of that imitation of the naturalness of the human skin intended and desired for dolls' heads of this character.

To solve these difficulties, it has heretofore been suggested to support the eye mounting and movable eye set at points remote from the upper walls or surfaces of the doll's head and at points least visible to the eye of the observer, as for extample, at the neck portion of the doll's head. This method of attaching the mounting and supporting the eye set, while substantially eliminating the undesired visibility of the structural parts of the mounting or eye set through the translucent walls of the head except at the neck thereof, presents other difficulties incident to the supporting or mounting of the eye set structures at points remote from the eye openings, which difficulties result in inadequately fitted and poorly operatable eye members or eye sets.

The prime object of our present invention may then be said to relate to the making of eye mountings for these translucent or semi-transparent dolls' heads in which the difficulties met with in supporting the mountings on the interior walls of the doll's head at points either close to or remote from the eye openings are substantially entirely obviated, and in which the eye mountings are so attached to the doll's head as to produce an accurate and workable fitting of the eyes at the eye openings of the head combined with the substantial elimination of any visibility or perceptibility of the mounting or eye set structure through the translucent walls of the doll's head.

To the accomplishment of the foregoing and such other objects as will hereinafter appear, our invention consists in the elements and their relation one to the other, as hereinafter more particularly described and sought to be defined in the claims; reference being had to the accompanying drawings which show the preferred embodiment of our invention, and in which:

Fig. 1 is a perspective view of a doll's head showing the mounting of our invention applied thereto with a part of the head broken away to show the interior construction of the mounting, Fig. 2 is a view thereof taken in cross-section in the plane of the line 2—2, Fig. 1, Fig. 3 is a view similar to Fig. 2 showing the eye set removed from the mounting, Fig. 4 is a perspective view showing socket elements used to form the eye mounting, Fig. 5 is a perspective view of a tool which may be employed for affixing the socket members of Fig. 4 to produce the eye mounting, and Fig. 6 is a view showing how the tool of Fig. 5 may be employed for practicing parts of the method for making the mountings.

Referring now more in detail to the drawings, we show our invention applied to a doll's head 10 made of a relatively thin body of semi-transparent or translucent material, such, for example, as transparent celluloid or similar cellulose derivatives treated to produce an imitation of the naturalness or tint of the human skin. These dolls' heads may be made to simulate natural and life-like tints characteristic of the human skin, the appearance of which, however, is materially marred by the casting of shades or shadows on the interior walls thereof from any structural elements which may be mounted within the same. These marring shades and shadows caused for example by eye mountings or supports within the doll's head are particularly pronounced when the doll's head is held up to the light. When the eye mountings or supports are affixed interiorly to the walls of the doll's head, such for example as at the forehead, nose or cheek portions thereof, the attachment becomes visible through the walls of the head and results in a gross disfiguration of the head and facial appearance thereof.

In accordance with our present invention, the eye set and mounting therefor are so organized and attached to and supported within the doll's head as to substantially eliminate all of the undesirable shades and shadows and visible points of attachment. This we accomplish by providing an eye mounting comprising eye socket members 11 and 12 attached to the doll's head 10 solely at the rims of the eye openings thereof and supporting a movable eye set 13 in said eye socket members 11 and 12, the socket members 11 and 12 being so attached to the doll's head as to make contact with said head solely at the rims or edges of the eye openings thereof and preferably by attaching means which is confined in area to the rims or edges of said openings.

More specifically, the socket eye members 11 and 12, preferably made of a material similar to that of the doll's head 10 and forming a relatively thin body produced in shell formation so as to be neatly fitted by the eye members of the eye set 13, are provided with openings 14 and 15 respectively, cut in size and contour to correspond to the eye openings 16 and 17 of the doll's head; and these shell-shaped socket members, shown separately in Fig. 4 of the drawings, are attached interiorly of the doll's head by arranging the openings 14 and 15 of the socket members in aligning registry with the eye openings 16 and 17 of the head and by then attaching the same to the doll's head at the rims only of said registering openings by attaching means such as a suitable adhesive $a$ which, as shown in Figs. 1 to 3 and 6 of the drawings, is confined in area to the rims or edges of said registering openings, said adhesive or binder extending encirclingly about the meeting edges of said openings. The socket members 11 and 12 are furthermore so shaped, as shown in the drawings, that the walls thereof are spaced from the walls of the doll's head 10 except at the rims of the registering openings; and by means of this construction and method of mounting, it will be seen that the points of attachment are confined to the edges of the eye openings and are eliminated from all other points or regions of the doll's head.

The eye set 13 preferably comprises a structure such as shown, for example, in the patent to A. Konoff No. 1,566,105 of Dec. 15, 1925, and consists of a cross rod 18 carrying eyes or eye members 19 and 20 longitudinally adjustable thereon, to which cross rod is centrally welded a weight arm 21 carrying the weight or gravity element 22. The cross arm 18 defines the means for supporting the eyes in the socket members 11 and 12, the said socket members being provided for this purpose with the apertures 23 and 24 in the opposite side walls thereof, and the opposite ends of the cross rod 13 being journalled in said apertures.

In placing the eye set 13 on the mounting 11—12 to produce the assembly shown in Fig. 2 of the drawings, the yieldability and resiliency of the socket members 11 and 12, as well as of the head 10, are relied upon to permit the cross rod 13, the length of which is greater than the distance between the apertures 23 and 24 in the socket members, to be snapped into an assembled supporting position. Preferably the opposing side walls of the socket members 11 and 12 are provided with extensions $11^a$ and $12^a$ which form the journals for the cross rod 18, and the said extensions are shaped to provide longitudinally directed channels or depressions 25, 26 which taper down to the apertures 23 and 24, said channels forming means for guiding the ends of the cross rod 18 into the assembled position. As will be readily apparent, pressure applied to the cross rod with the ends thereof guided by the channels 25 and 26, causes the sockets to yield laterally until the ends of the rod 18 snap into the apertures 23 and 24, after which the resiliency of the parts causes the same to resume their normal positions with the eye set suitably supported, all as shown for example in Fig. 2 of the drawings. It will be also evident that the eye set may be readily removed by gentle pressure applied to the extensions $11^a$ or/and $12^a$ sufficient to release the cross rod from supported position.

By means of this construction it will now be seen that we are enabled to attain a number of desired objects. The eye socket members 11 and 12 make contact with the doll's head only at the rims of the eye openings, and this therefore eliminates all other points of support which are found objectionable or detrimental, as heretofore set forth. The attachment of the mounting as well as the support for the eye set are localized at the eye openings of the doll's head and therefore enable a close and accurate fitting of the eye members in the eye openings to be obtained. The attachment of the socket members being localized at the eye openings, the shades or shadows incident to the attachment are restricted to the lid regions of the eyes and therefore produce or lend a distinctive coloring which resembles the similar appearance of the human eye. Moreover, the eye sockets present from the exterior of the doll's head an appearance of continuity, since all openings visible from the exterior of the doll's head are eliminated. Furthermore, the mounting permits of a very facile detachable attachment of an eye set such as 13 thereon.

In Figs. 4 to 6 of the drawings we have illustrated a preferred method of attaching the socket members 11 and 12 to the doll's head 10 which further illustrates another advantage incident to the use of eye mountings of our present invention.

In accordance with the preferred practice of this method, the socket members 11 and 12 are first placed in position on anvils 27 and 28 shaped to fit the socket members and spaced to correspond to the spacing of the eye members 19 and 20, after which the doll's head 10 is placed, as shown in Fig. 6 of the drawings, in supported position on the anvils 27 and 28 with the eye openings of the head 10 and the corresponding openings of the socket members in registry, this registry being produced by the oval-shaped projections 29 and 30 forming part of the anvils 27 and 28. With the doll's head thus positioned, a member 31 is then brought down into engagement with the registering rims of the head and socket openings for compressing these together as shown in Fig. 6 of the drawings. The adhesive or binder, such for example as acetone, is then applied from the exterior of the head by means of a brush 32', the same being applied along the meeting rims or edges of the openings of the head and the socket members. This acetone binder is capillarily attracted into the space between the meeting rims of the socket member and head walls and in the resulting construction defines a confined line of adhesive $a$. The acetone adhesive is left to dry while the parts are under compression, as shown in Fig. 6 of the drawings, after which the member 31 is released and the doll's head with the now attached socket members thereon removed from position.

In Fig. 5 of the drawings we show a preferred form of tool or apparatus for practicing this process. The anvil members 27 and 28 provided with the placement pins 32 arranged to correspond in position with the ends of the cross rod 13, are fixed to a horizontal arm 34 anchored to a standard 35 which in turn is positioned on a support or base 36. The member 31 is attached by means of the rod 37 to an arm 38 pivoted by means of the pivot pin 39 between the tines 35$^a$ of the upper forked portion of the standard 35; and the said arm 38 is actuated by a bell crank lever 40 which is pivoted by means of the pin 41 to and between the tines 35$^a$, the bell crank lever 40 being connected to the arm 38 by the link members 42. The construction and arrangement of the parts are such that when the member 31 is moved to its compressing position shown in Fig. 6 of the drawings, the links 42 join with the arm 43 of the lever 40 to form a toggle member which functions to lock the member 31 in its compressing position. The arm 38 is provided with a stop pin 44 to determine the limit of the toggle motion of the links 42. Desirably the member 31 is formed and shaped so as to serve as a means for compressing the rims to be attached together at substantially all points of contact thereof and to serve as a receiving well and guide means for the acetone or other binder. Thus this member 31 is shaped to comprise a pair of elements 45 and 46 which are received by the anvil extensions 29 and 30 to form annular-shaped wells which may receive the acetone or the applying brush 32, the engaging edge portions of these elements 45 and 46 having a configuration so as to produce the compressing engagement of the rims to be joined on the anvil heads 27 and 28.

While we have shown and described our invention in the preferred form, it will be apparent that many changes and modifications may be made in the structure disclosed without departing from the spirit of the invention, defined in the following claims.

We claim:

1. In combination, a translucent doll's head provided with eye openings, eye socket members having openings registering with said eye openings, said socket members making contact with the head solely at the rims of the openings, and a movable eye set oscillatably supported in said socket members, the construction being such that the socket members and eye set are substantially invisible through the walls of the head.

2. In combination, a translucent doll's head provided with eye openings, eye socket members having openings registering with said eye openings, said socket members contacting with and being adhesively attached to the head solely along a thin line of contact adjacent the rims of the openings, and a movable eye set oscillatably supported in said socket members.

3. In combination, a doll's head made of translucent celluloid material and provided with eye openings, eye socket members also made of celluloid material and having openings registering with said eye openings, said socket members being attached to the head solely at the rims of the openings by a celluloid-adhering substance confined to the area adjacent the rims of the openings, and a movable eye set oscillatably supported in said socket members.

4. In combination, a translucent doll's head provided with eye openings, eye socket members having openings registering with said eye openings, said socket members being attached to and making contact with the head solely at the rims of the openings, and an oscillatable eye set supported in said socket members, said eye set including a cross member and eyes spaced thereon to fit the socket members, and said socket members having means for supporting the ends of the cross member.

5. In combination, a translucent doll's head provided with eye openings, eye socket members having openings registering with said eye openings, means attaching said socket members to the head solely at the rims of the openings and the area immediately adjacent thereto, and an oscillatable eye set including a cross member and eyes spaced thereon supported in the socket members, said cross member being supported in socket member walls the distance between which is normally less than the length of the cross member and the resiliency of which in mounted position is sufficient to permit the cross member to be pushed into supporting relation therewith.

Signed at New York in the county of New York and State of New York this 14th day of February, A. D. 1928.

ALEXANDER KONOFF.
SAMUEL MARCUS.